United States Patent
Rosenberg

(10) Patent No.: US 11,172,069 B2
(45) Date of Patent: Nov. 9, 2021

(54) SYSTEMS AND METHODS FOR UTILIZING HTTP FOR TELEPHONY TRUNKING BETWEEN A PROVIDER AND A CONSUMER

(71) Applicant: Five9, Inc., San Ramon, CA (US)

(72) Inventor: Jonathan Rosenberg, Freehold, NJ (US)

(73) Assignee: FIVE9, INC., San Ramon, CA (US)

( * ) Notice: Subject to any disclaimer, the term of this patent is extended or adjusted under 35 U.S.C. 154(b) by 0 days.

(21) Appl. No.: 16/917,968

(22) Filed: Jul. 1, 2020

(65) Prior Publication Data
US 2021/0006662 A1    Jan. 7, 2021

Related U.S. Application Data

(60) Provisional application No. 62/870,710, filed on Jul. 4, 2019.

(51) Int. Cl.
| | | |
|---|---|---|
| G06F 15/16 | (2006.01) | |
| H04M 7/00 | (2006.01) | |
| H04L 29/08 | (2006.01) | |

(52) U.S. Cl.
CPC ............ H04M 7/006 (2013.01); H04L 67/02 (2013.01); H04L 67/1004 (2013.01); H04L 67/146 (2013.01); H04L 67/101 (2013.01)

(58) Field of Classification Search
CPC . H04L 65/1046; H04L 67/02; H04L 67/1008; H04L 67/101; H04L 67/146; H04L 67/2814
USPC .......................................... 709/227; 370/356
See application file for complete search history.

(56) References Cited

U.S. PATENT DOCUMENTS

| | | |
|---|---|---|
| 2002/0046279 A1 | 4/2002 | Chung |
| 2008/0063159 A1 | 3/2008 | Pounds |
| 2010/0142516 A1* | 6/2010 | Lawson .............. H04M 7/0021 370/352 |
| 2011/0112901 A1 | 5/2011 | Fried et al. |
| 2013/0054806 A1 | 2/2013 | Francis et al. |
| 2013/0339781 A1 | 12/2013 | Wamorkar et al. |
| 2014/0269446 A1 | 9/2014 | Lum et al. |

OTHER PUBLICATIONS

International Search Report and Written Opinion, dated Sep. 24, 2020, for PCT/US2020/040406, filed Jul. 1, 2020.

* cited by examiner

*Primary Examiner* — Wing F Chan
*Assistant Examiner* — Andrew Woo
(74) *Attorney, Agent, or Firm* — Jones Day

(57) ABSTRACT

Systems and methods are described herein for providing a Voice over Internet Protocol (VoIP) call. In an embodiment, a load balancing processor receives a re-initiated HTTP request from a client processor upon detection that an initial call server is no longer active, and sends the re-initiated HTTP request to a second call server. The second server generates updated call resource information that identifies the second server as the new server resource for the call, and sends the updated call resource information over the IP network to the client processor. Subsequent HTTP requests from the client processor for sending and receiving signaling and media data for the call are received at the second server using the updated call resource information.

16 Claims, 8 Drawing Sheets

SYSTEMS AND METHODS FOR UTILIZING HTTP FOR TELEPHONY TRUNKING BETWEEN A PROVIDER AND A CONSUMER

CROSS-REFERENCE TO RELATED APPLICATION

This application claims priority from U.S. Provisional Patent Application number 62/870,710, filed Jul. 4, 2019, the contents of which are incorporated herein by reference in their entirety.

TECHNICAL FIELD

The technology described herein relates generally to systems and methods for providing a protocol for communicating over a packet network such as the Internet.

BACKGROUND

Cloud computing platforms have become mainstream for the development of software applications. These platforms are often targeted at enabling web applications, and as such many of their features are based on the usage of HTTP.

One example is HTTP load balancers. Cloud computing platforms provide highly scalable, geographically distributed, redundant load balancers. These load balancers can monitor the state of downstream servers and can uniformly distribute load amongst them. The load balancers can compensate for failure of individual nodes and send new traffic to other nodes.

Autoscaling is another example. A typical cloud computing platform can automatically add new instances of a server backend, or remove them, and automatically configure the load balancers to include them in the pool of available servers.

Yet another example is Kubernetes, which allows web-based applications to be deployed into containers (typically Docker), with load balancing, scaling, and HTTP request routing.

Another example is HTTP tracing tools, which facilitate the tracing of requests through distributed microservices. These tools can autogenerate sequence diagrams and facilitate in troubleshooting.

Yet another example is API gateways, which provide authentication and authorization, provisioning of applications, rate limiting, analytics, sandboxing for testing, embedded documentation, and so on.

And yet another example is denial-of-service prevention techniques, typically done using BGP peering and re-routing. Though in principle these techniques can work for voice-over-IP (VoIP), they are typically deployed in conjunction with the load balancers which represent the entry point into these cloud provider networks. Consequently, the protections these cloud providers offer do not extend to applications which merely use these platforms for virtual machines.

A more recent technology is service meshes, which utilize sidecar HTTP proxies to facilitate inter-service communications. These systems come with robust control planes which enable additional routing features, such as canary deploys, percentage based routing, and so on.

There are many applications being deployed into these cloud platforms which require interconnection with the public switched telephone network (PSTN). Examples of such applications include cloud PBXs, cloud contact centers, cloud meetings applications, and so on. Furthermore, commerce websites would like to allow customers to call into the telephone network for customer support.

In order for these applications to connect to the PSTN, they typically deploy Session Initiation Protocol (SIP) based servers—SBCs, SIP proxies, and softswitches, to provide this interconnection. Unfortunately, SIP based applications cannot make use of the many capabilities these cloud platforms afford to HTTP based applications. SIP servers are usually deployed on bare metal or VMs at best. Application developers typically must build their own load balancing, HA, failover, clustering, security, and scaling technologies, rather than using the capabilities of these platforms.

This has creating a barrier to entry, particularly for applications such as websites which are not expert in VoIP technologies. Furthermore, it has meant that VoIP applications have been unable to take advantage of the many technology improvements that have come to networking and protocol design.

In addition, SIP trunking has suffered from complex provisioning operations, oftentimes requiring the exchange of static IPs and ports. These operations are almost never self-service and consequently, SIP trunk turn ups can take weeks. Finally, perhaps the biggest challenge with SIP trunking has been its abuse for injecting robocalls.

SUMMARY

Systems and methods are described herein for providing a Voice over Internet Protocol (VoIP) call. In an embodiment: a load balancing processor receives a Hypertext Transfer Protocol (HTTP) request to create a call from a client processor over an Internet Protocol (IP) network; the load balancing processor directs the HTTP request to a first server in a cluster of servers; the first server generates call resource information identifying the first server as a server resource for the call, and sends the call resource information to the client processor over the IP network; the first server receives HTTP requests over the IP network from the client processor for sending and receiving signaling and media data for the call, where the HTTP requests are sent from the client processor using the call resource information; the load balancing processor receives a re-initiated HTTP request from the client processor that includes the call resource information, where the re-initiated HTTP request is sent by the client processor upon detection that the first server is no longer active; the load balancing processor sends the re-initiated HTTP request to a second server in the cluster of servers; the second server generates updated call resource information that identifies the second server as the server resource for the call, and sends the updated call resource information over the IP network to the client processor; and the second server receives subsequent HTTP requests over the IP network from the client processor for sending and receiving signaling and media data for the call, where the subsequent HTTP requests are sent from the client processor using the updated call resource information.

DETAILED DESCRIPTION

Figure 1:
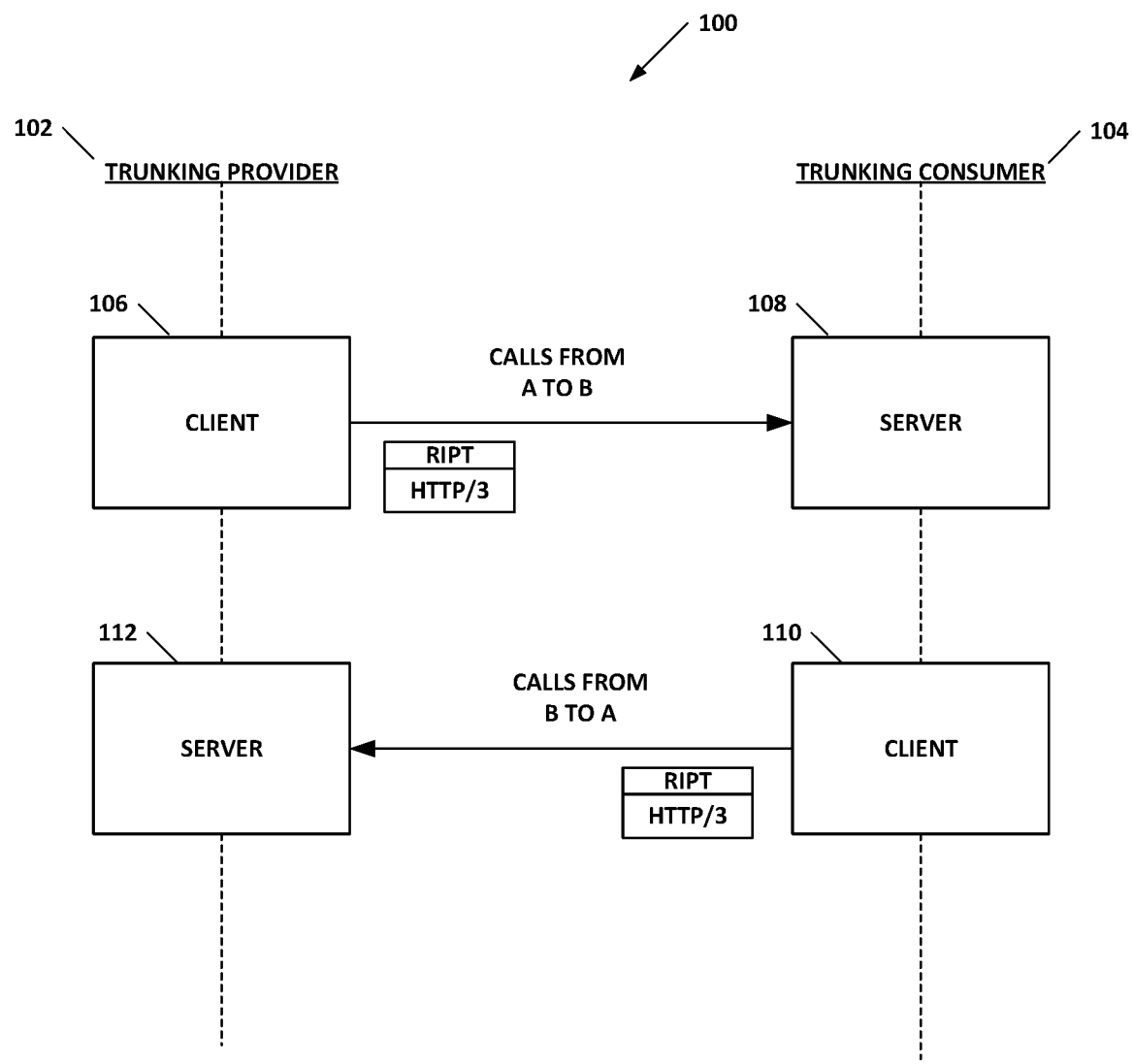
FIG. 1 is a diagram illustrating an example client-server architecture for providing telephony trunking between a provider and a consumer utilizing HTTP.

This disclosure provides examples of a Realtime Internet Peering for Telephony (RIPT) protocol, along with example systems and methods for implementing the same. RIPT may be used to provide telephony peering between a trunking provider (such as a telco), and a trunking consumer (such as an enterprise, cloud PBX provider, cloud contact center provider, and so on). RIPT is an alternative to SIP, SDP and RTP for this use case, and is designed to run on top of a Hypertext Transfer Protocol (HTTP), such as HTTP/3. Using HTTP allows trunking consumers to more easily build their applications on top of cloud platforms, such as AWS, Azure and Google Cloud, all of which are heavily focused on HTTP based services. RIPT also addresses many of the challenges of traditional SIP-based trunking. For example, RIPT may provide for secure caller ID via the Secure Telephone Identity Revised (STIR) standard, and may provide automated trunk provisioning as a protocol component. RIPT may also support both direct and "BYO" (Bring Your Own Broadband) trunk configurations. Because RIPT runs over HTTP, it can work through Network Address Translation devices (NATs) and firewalls with the same ease as HTTP does, and easily supports load balancing with elastic cluster expansion and contraction, including auto-scaling—all because RIPT is an HTTP application. RIPT may also provide built in mechanisms for migrations of calls between RIPT client and server instances, enabling failover with call preservation FIG. 1 is a diagram illustrating an example client-server architecture 100 for providing telephony trunking between a trunking provider 102 and a trunking consumer 104 utilizing the RIPT protocol. As illustrated in FIG. 1, RIPT enables one administrative domain to send and receive voice calls with another domain. RIPT may, for example, function as the minimum protocol required to interconnect voice between a trunking provider 102 and a trunking consumer 104 (i.e., a domain wishing to access trunking services). As shown in FIG. 1, the RIPT protocol enables the trunking provider 102 and the trunking consumer 104 to implement both RIPT client and RIPT server roles, where a RIPT server receives calls and a RIPT client sends calls. In the example illustrated in FIG. 1 a trunking provider 102 operates as a RIPT client 106 to initiate a call to a trunking consumer 104 operating as a RIPT server 108. In addition, the trunking consumer 104 is also shown operating as a RIPT client 110 to initiate a call to the trunking provider 102 operating as a RIPT server 112.

RIPT clients and RIPT servers are HTTP (e.g., HTTP/3) applications, running on top of HTTP. That is, RIPT utilizes HTTP, but is not an extension of the HTTP protocols. In this way, RIPT is able to take advantage of advancements in the HTTP protocols (such as advancements in HTTP/3) without requiring the HTTP protocols to include any special features for the benefit of VoIP. The RIPT procedures for sending and receiving calls (described in more detail below) are therefore compatible with the core HTTP primitives available to applications, such as opening connections, closing connections, sending request and responses, receiving requests and responses, and setting header fields and bodies.

HTTP is strictly a hop-by-hop (HBH) technology. Though it does support the notion of proxies (e.g., the CONNECT method for reverse proxies), the protocol is fundamentally designed to be between a client and an authoritative server. What happens beyond that authoritative server is beyond the scope of HTTP, and can (and often does) include additional HTTP transactions. Consequently, in order to reside within HTTP, RIPT follows the same pattern and only concerns itself with HBH behaviors. Like HTTP, a RIPT server can also act as a RIPT client and further connect calls to downstream elements. However, such behavior requires no additional functionality.

Unlike SIP which relies on communications between a pair of user agents, HTTP requires that one entity is a client and the other is a server. In order to utilize HTTP, RIPT operates under HTTP requirements, meaning distinct roles for clients and servers. Clients must always initiate connections and send requests, not servers. To handle this, RIPT specifies that the domain associated with the caller implements the RIPT client, and the domain receiving the calls is the RIPT server. For any particular call, the roles of client and server do not change. To facilitate calls in either direction, a domain can implement both RIPT client and RIPT server roles, as shown in FIG. 1. However, there is no relationship between the two directions.

HTTP load balancing is effective because it treats each request/response pair as an independent action which can be routed to any number of backends. In essence, the request/response transaction is atomic, and consequentially RIPT operates this way as well. Inter-domain interconnect—used primarily for interconnection with the PSTN—is done traditionally with Session Border Controllers (SBCs) which terminate and re-originate media. RIPT combines signaling and media together on the same connection. To ensure low latency, RIPT uses multiple independent request/response transactions—each running in parallel over unique streams (e.g., HTTP/3 streams)—to transmit media.

RIPT also provides for separation between calls and connections. In SIP, there is a fuzzy relationship between calls and connections. In some cases, connection failures cause call terminations, and vice a versa. HTTP, on the other hand, very clearly separates the state of the resource being manipulated, with the state of the HTTP connection used to manipulate it. This design principle utilized by RIPT. Consequently, call state on both client and server exist independently from the connections which manipulate them. This allows for greater availability by enabling connections for the same call to move between machines in the case of failures.

The utilization of HTTP also makes voice communications under the SIPT protocol compatible with cloud-based platforms. Cloud platforms are typically based on the behavior of HTTP, which has been based on TCP connections and therefore does most of its routing at the connection layer, and not the IP layer. Furthermore, modern cloud platforms are full of NATs and private IP space, making them inhospitable to SIP based applications which still struggle with NAT traversal. RIPT does not suffer from this. In general, "addressing", to the degree it exists at all, is done with HTTP URIs. RIPT, as an application on top of HTTP, does not use or convey any IP addresses or ports. Furthermore, the client never provides addressing to the server—all traffic is sent in the reverse direction over the connection.

RIPT may also include a built-in mechanism for provisioning, an example of which is described in more detail below with reference to FIG. 3. This enables RIPT trunks to be self-provisioned through web portals, and instantly turned on in production. This capability may, for example, help accelerate the adoption of telecommunications services across the web.

RIPT is also compatible with modern cloud-based authentication protocols, as described in more detail below with reference to FIG. 4. HTTP, due to its client-server nature, uses asymmetric techniques for authentication. Most notably, certificate based authentication is done by the client to verify that it is speaking to the server it thinks it should be speaking to. For the server to identify the client, modern platforms make use of OAuth2.0. Although OAuth is not actually an authentication protocol, the use of OAuth has allowed authentication to be done out of band via separate identity servers which produce OAuth tokens which can then be used for authentication of the client. RIPT follows this same approach. For each call, one domain acts as the client, and the other, as the server. When acting as a server, the domain authenticates itself with TLS and verifies the client with OAuth tokens. For calls in the reverse direction, the roles are reversed. To make it possible to easily pass calls in both directions, RIPT allows one domain to act as the customer of another, the trunking provider. The customer domain authenticates with the provider and obtains an OAuth token using traditional techniques. RIPT then allows the customer domain to automatically create a bearer token for inbound calls and pass it to the provider.

RIPT also provides enhanced security features that are compatible with modern cloud-based platforms. Because of the HBH nature of RIPT, security is done fundamentally at the connection level. Since media is also carrier over the HTTP connection, both signaling and media are covered by the connection security provided by HTTP (e.g., HTTP/3). For example, because of the mandatory usage of TLS1.3 with HTTP/3, and the expected widespread deployment of HTTP/3, running VoIP on top of HTTP/3 will bring built-in encryption of media and signaling between peering domains, which is a notable improvement over the current deployment situation.

RIPT may also provide authenticated caller ID functionality. Robocalling is seeing a dramatic rise in volume, and efforts to combat it continue. One of the causes of this problem is the ease of which SIP enables one domain to initiate calls to another domain without authenticated caller ID. RIPT provides a remedy to this problem by enabling the client and servers to implement STIR. Because RIPT is configured for peering between providers (and not client-to-server connections), STIR is applicable. RIPT clients may therefore be requires to insert a signed passport, or pass one through if it exists. Similarly, RIPT servers may act as verifying parties and reject any calls that omit a passport.

RIPT may also provide enhanced path validation capabilities. HTTP/3 is designed to work through NAT as a client-server protocol. It has built in techniques for dealing with NAT re-bindings, IP address changes due to a client moving between networks (e.g., wifi to cellular data). HTTP/3 has built in path validation that ensures that HTTP cannot be used for amplification attacks. To work with HTTP, RIPT utilizes the HTTP approaches for these problems.

Figure 2:
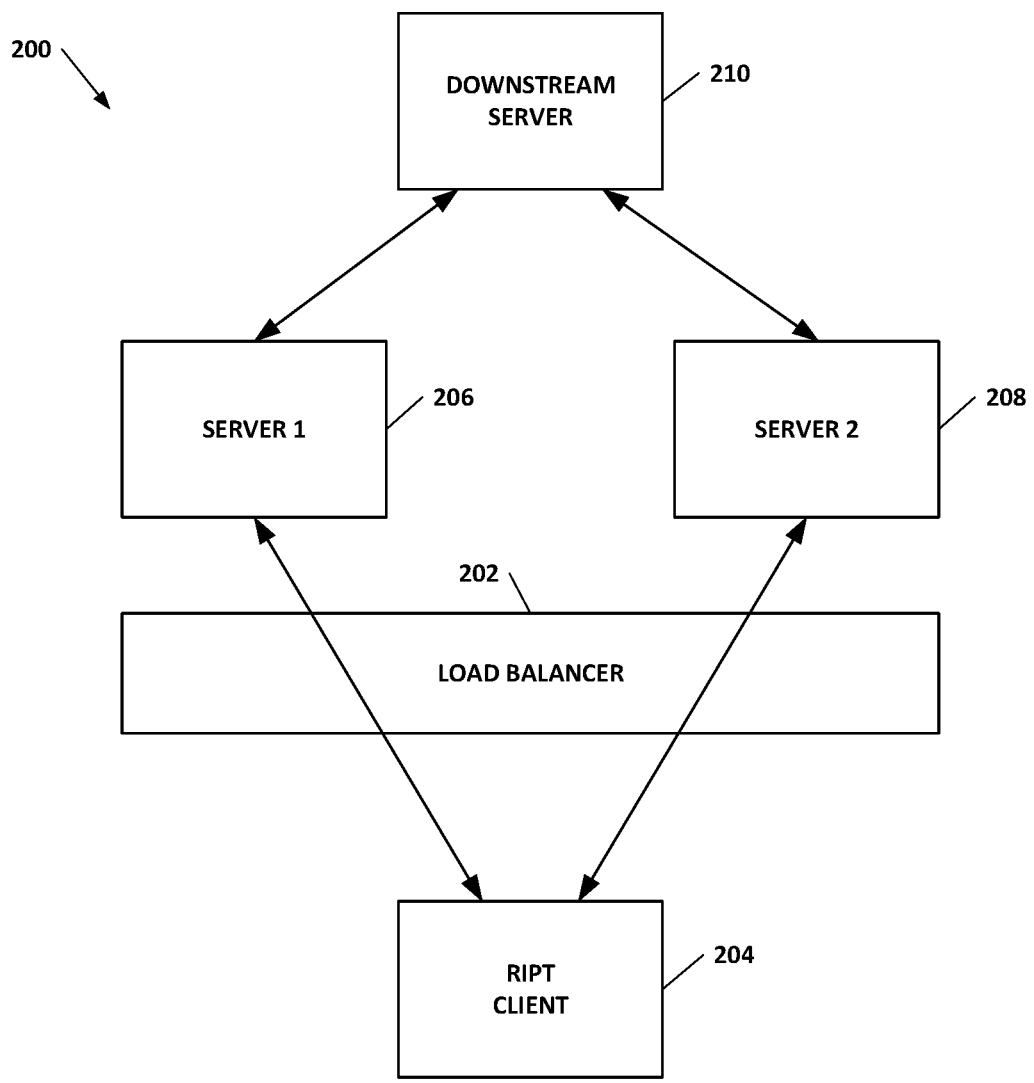
FIG. 2. is a diagram illustrating an example client-server architecture utilizing an HTTP load balancer.

RIPT is also designed such that all communications between a RIPT client and a RIPT server can sit behind a load balancer, as illustrated in FIG. 2. Specifically, FIG. 2 is a diagram illustrating an example RIPT client-server architecture 200 utilizing an load balancer 202, such as an HTTP load balancer. Because both the trunk provider and the trunk consumer implement the client and server roles in a RIPT system, both entities will typically have a load balancer used to receive incoming calls.

RIPT may, for example, operate with both L4 and L7 HTTP load balancers. In embodiments, RIPT may hide the number of servers behind the load balancer, allow the addition or removal of servers from the cluster at will, and not expose any of this information to the peer. In embodiments, RIPT may enable the usage of autoscaling technologies used in cloud platforms, without any special consideration for RIPT. By utilizing one or more of these features, RIPT provides for call preservation in the face of failures of the server or client. In embodiments, RIPT may also support built-in migration, allowing a server to quickly shed load in order to be restarted or upgraded, without any impact to calls in progress.

Consider, for example, a client 204—which can be a VoIP client (e.g., softphone, hardphone, or a server like an IP PBX or SBC)—that wishes to send a call, comprising media and signaling, to a server for processing. That server may be implemented as a cluster of servers 206, 208 with a load balancer 202, as shown in FIG. 2. Those servers 206, 208 in turn send the call, after processing, to a downstream server 210. In embodiments, the downstream server 210 may also be a cluster, but is shown in FIG. 2 as a single instance for simplicity.

In traditional call signaling using SIP and RTP, the client would establish a call with an INVITE request. Traditional load balancing in SIP (based on DNS or SIP proxies) would land that call on server 1, which then sends the call to the downstream server. Once the call setup was complete, a signaling channel and media channel were established from client to server 1 to the downstream server. Unfortunately, if server 1 failed, the call was dropped under this traditional method.

A RIPT system, on the other hand, provides for call preservation in the face of failures of the server or client. In RIPT, call signaling and media both utilize HTTP. In embodiments of a RIPT system, a call may be established using the following steps:

1. Creation of the call by performing an HTTP POST operation to a resource, such as /calls, which creates a new call on the server. The server returns a unique call identifier (the call URI) to the client.
2. Creation of signaling events for the call, performed by creating a long-lived PUT and GET to a sub-resource of the call URI. The long-lived PUT allows sending of call events (such as hangup) and the GET for receiving call events (such as ringing, answered, ended).
3. Sending and receiving media by performing a series of PUT or POST requests to another sub-resource of the call URI to send media, and a series of GET or POST requests to a sub-resource of the call URI to receive media.

With reference again to the system 200 shown in FIG. 2, the above process for establishing a call may, for example, be performed identically from the client 204 to either server 1 (206) or server 2 (208), and then from server 1/2 (206, 208) to the downstream server 210. For example, a call may be initially established by the client 204 by performing a POST operation to /calls to create the call. This HTTP request arrives at the load balancer 202. The load balancer 202 may, for example be a load balancer to one of the servers in the cluster, for example server 1 (206). In this case, when the HTTP request arrives to server 1 (206) via the load balancer 202, server 1 (206) returns the call URI. Subsequent requests made to that call URI or any of its sub-resources will then preferably be routed to server 1. This can be accomplished, for example, using traditional HTTP techniques, such as HTTP session cookies, embedding routing information in the call URI in the path or URI attributes, or using an authority component which preferentially routes to server 1 (206) based on DNS or other configuration information.

Continuing with the example, after returning the call URI, server 1 (206) creates a call to the downstream server 210. In this way, server 1 (206) will also have a URI for the call as seen by the downstream server 210. Call this the "downstream call URI". Server 1 (206) stores in a database, shared by all the servers in the cluster, the call URI that was created, the downstream call URI, and other properties of the call needed for processing the call (for example, whether the call needs transcoding).

In the event of a call failure, the HTTP load balancer 202 can quickly detect the failure (e.g., within a second or less.) This is because, there will typically be extremely high volumes of HTTP transactions towards server 1 (206)—each media packet is a request. Aggregated across many calls, the request/response latency will typically be extremely small, but when a failure happens the request/response latency immediately increases. For example, HTTP error (e.g., 5xx) responses and timeouts will follow. The load balancer 202 may also detect failure through HTTP probes, which may look identical to media since they can go to the same resources and sub-resources, making it more likely that a server failure is detected.

Upon detecting a failure of server 1 (206), the load balancer 202 sends subsequent requests to server 2 (208). The client 204 will also quickly detect (e.g., within a second or so) the timeout due to a lack of response to media requests. When those requests timeout, the client 204 may retry the request, which is normal http behavior. Typically the client 204 will retry the request with a media request to send or receive a media packet. When the retried request arrives at the load balancer 202, the load balancer 202 redirects the request to server 2 (208). In this way, server 2 (208) receives a request for a sub-resource of the call URI, which is a call that server 2 (208) is not currently handling. In response, server 2 (208) may access the database, look up the call URI, and retrieve the information needed to process the call along with the next-hop call URI, i.e., the "downstream call URI". This information provides server 2 (208) the information needed to continue processing the call.

Continuing with the example, server 2 (208) uses the retrieved call information to create a signaling channel with a long-lived GET and PUT towards the downstream server 210, and similarly starts sending and receiving media packets with GET and PUT requests. This will cause the downstream server 210 to now direct signaling events and media packets to server 2 (208) in responses to those requests, which server 2 (208) can now forward to the client 204 in responses. Server 2 (208) may also return a cookie, if needed, to ensure that subsequent requests for this call now route to server 2 (208), in the event that server 1 (206) comes back up during the call. Alternatively, server 2 (208) may return an updated call URI which now preferentially routes to server 2 (208), which will be used by the client 204. At this point, the call has in effect moved to server 2 (208). No packets were lost—anything which could not be delivered was resent to server 2 (208).

In another example, the RIPT system 200 illustrated in FIG. 2 may be used to gracefully shutdown a server, rather than having an unexpected failure. This may, for example, occur in the event of software upgrades, or for migration of virtual machines or pods to different compute nodes. In this case, the RIPT system 200 may be used to perform the upgrade without any interruption in calls. For example, if an admin of the RIPT system wishes to shut down or upgrade a server, they perform the following steps:

1. Reconfigure the load balancer 202 so that all requests for new calls no longer get routed to the server being shut down or upgraded, but existing calls do. Since these are different URI resources this is typically an easy configuration to make.
2. The server being shut down or upgraded sends a 'migrate event' on the call signaling channel for one or more of the calls currently in progress. When the client 204 receives this event, the client 204 behaves in the same way that it would upon detecting a failure by ending its signaling and media requests, and resending them. The resent requests get sent without session cookies, which means they get routed to another available server in the cluster. The new server may then establish a new cookie and the call can continue on the second server.

As one example variation to the above procedure, the server may send, in a migration request, a new call URI to replace the current one. This allows for URI-based routing in the load balancer 202 in the event that session cookie routing cannot be supported. This is also more robust in cases where the client cannot easily control the session cookie at the application layer in order to expire it.

FIGS. 3-6 are flow diagrams that illustrate example operations of a packet-based communications system that employs the RIPT protocol for voice communications.

Configuration

Figure 3:
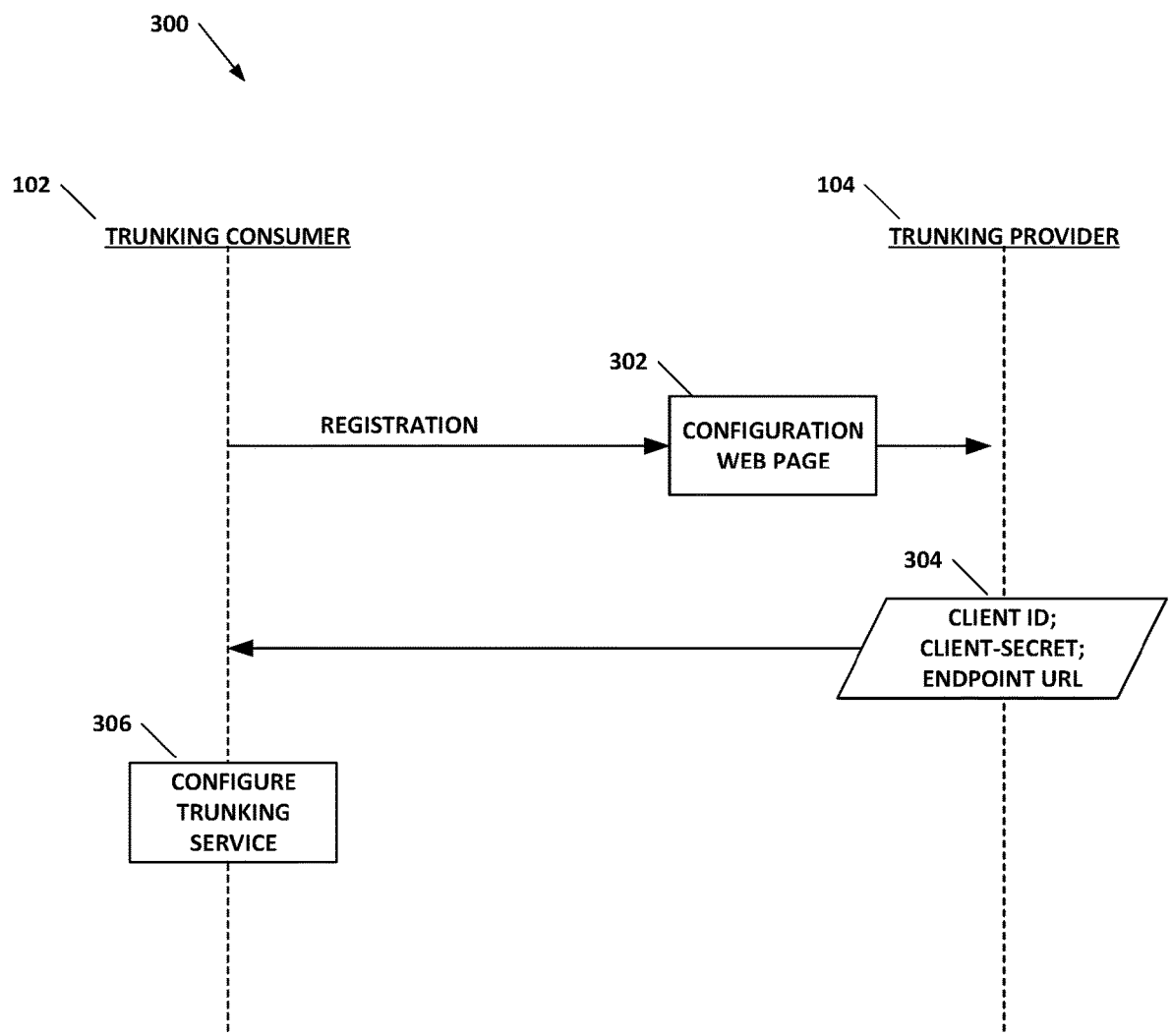
FIG. 3 is a flow diagram illustrating an example of a configuration phase for telephony trunking between a provider and a consumer utilizing HTTP

With reference first to FIG. 3, this figure illustrates an example of a configuration phase for RIPT communications. RIPT configuration happens when a trunking consumer wishes to be able to provision, on demand, new RIPT trunks with a trunking provider. This configuration phase may occur, for example, when an OAuth2.0 client application (such as a softswitch, cloud PBX, cloud contact center, etc.) wishes to enable trunking customers to provision RIPT trunks against a trunking provider. The trunking provider acts as the resource provider in OAuth2.0 parlance.

As shown in FIG. 3, a trunking consumer 102 may, for example, initiate the RIPT configuration phase by registering with a configuration web page 302 maintained by a trunking provider 104. In response, the trunking provider 104 may generate and return configuration information 304, such as a client identification (ID), client-secret encryption information, and an authorization endpoint URL. The trunking consumer 104 may then use the configuration information 304 to configure a trunking service 306.

One example use case is that of an enterprise, which has deployed an IP PBX of some sort within its data centers. Once deployed, the enterprise needs to enable the PBX to place and receive calls towards the PSTN. The enterprise contracts with a RIPT trunking provider. All of this happens as a precursor to configuration. At the end of the contracting process, the enterprise administrator will visit the configuration web page, and be able to register their enterprise PBX. This process will typically return a client-ID, client-secret, and authorization endpoint URL, as illustrated in FIG. 3. The administrator manually enters these into the configuration of their PBX.

As another example use case, a cloud contact center, cloud PBX provider, or any other saas application which wishes to obtain trunking services, can contract with a RIPT trunking provider. In a similar process to the enterprise case above, the administrator obtains a clientID, client-secret, and authorization endpoint URL which are configured into their service.

In another use case, an enterprise administrator has purchased trunking services from a RIPT trunking provider. The enterprise administrator have separately purchased cloud PBX, cloud contact center, or another saas service which requires connectivity to a RIPT trunk. In this case, the cloud PBX, cloud contact center, or other saas service acts as the RIPT trunk consumer. The RIPT trunk consumer would configure itself as a client with a variety of RIPT trunking providers, and for each, obtain the clientID, client-secret and authorization URL. This will allow the customers of the RIPT trunking consumer to provision RIPT trunks automatically, and point them to the RIPT trunking consumer.

RIPT Trunk Provisioning

Figure 4:
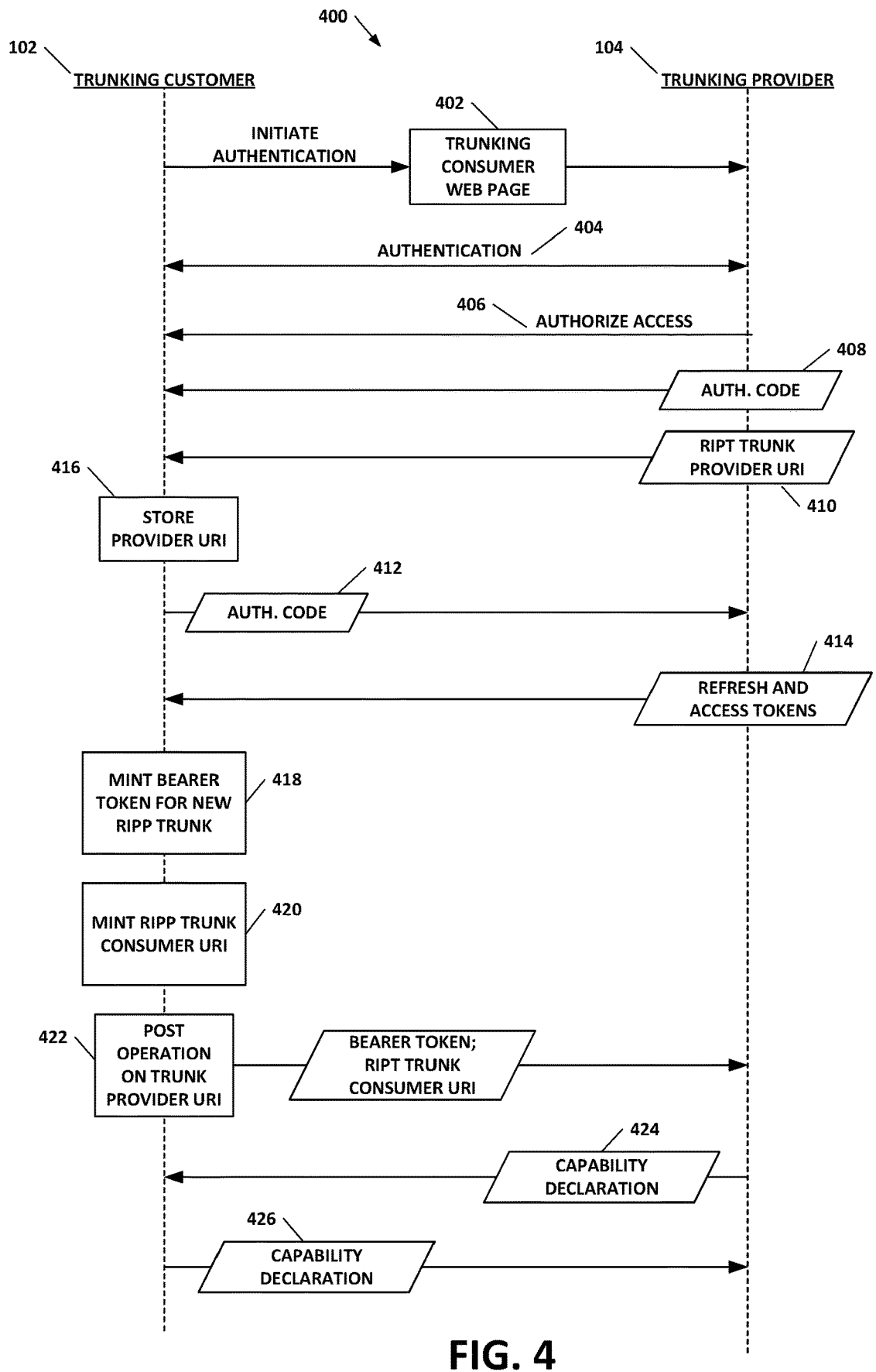
FIG. 4 is a flow diagram illustrating an example operation for provisioning telephony trunking between a provider and a consumer utilizing HTTP.

With reference now to FIG. 4, this figure illustrates an example operation 400 for provisioning RIPT communications. Once a trunking customer has purchased services from a trunking provider, the trunking customer can perform provisioning. More specifically, once a RIPT consumer has been configured as an OAuth client application with a RIPT provider, the RIPT customer can provision a RIPT trunk, for example using an on-demand a web form.

Provisioning is the process by which a trunking customer connects a RIPT trunk from a trunking provider to trunking consumer. Provisioning may, for example, be accomplished using OAuth2.0 code authorization techniques. In the case of RIPT, the OAuth resource owner is the trunking customer. The OAuth client is the RIPT implementation within the trunking consumer. The resource server is the RIPT implementation in the trunking provider. RIPT consumers may, for example, provide a self-service web form for such provisioning.

To provision a RIPT trunk, the trunking customer 102 may, for example, initiate an authentication procedure by accessing a web page 406 hosted by the trunking consumer, for example by clicking on a user interface icon labeled with an identification of the trunking provider 104. This will begin an authentication (e.g., OAuth 2) authorization flow 404, where the trunking customer 102 provides necessary information to authenticate with the trunking provider 104. The authorization flow 404 may, for example, utilize the clientID, client-secret and authorization endpoint URL configured during the configuration phase shown in FIG. 3. During authorization 404, the RIPT customer will authenticate to the RIPT provider and authorize creation of a new RIPT trunk.

In response, the trunking provider 104 authorizes the access 406, generates an authorization code 408, and generates a RIPT trunk provider URI 410. The provider URI 410 contains a path component, but preferably does not contain any URI parameters. The URI may, for example, be an HTTPS URI and may preferably support HTTP/3. The path component may be a globally unique identifier for the trunk, and preferably should not depend on the authority component as part of the namespace for purposes of uniqueness. The provider URI 410 may, for example, be included in a new OAuth parameter and returned as a parameter in the authorization response. For example, the URI may be returned in the OAuth2.0 parameter "ript-trunk" and may be base64 encoded.

The trunking consumer trades the authorization code 412 for a refresh and access token 414 and stores the provider URI 416. The refresh and access token 414 is issued by the RIPT provider, and preferably will last a long time in order to avoid the resource owner needing to manually re-authorize. The trunk consumer should, however, be prepared for its access and refresh tokens to be invalidated at any time. The RIPT consumer extracts the authentication parameter (e.g., the "ript-trunk" OAuth parameter) from the authorization response, and decodes and persists the parameter.

The trunking consumer mints a bearer token 418 associated with the new RIPT trunk, and also mints a RIPT trunk consumer URI 420 for receiving calls from the provider on this trunk. Both of these are passed to the trunking provider via a POST operation 422 (e.g., an HTTPS PUT request to /consumerTrunk) on the RIPT trunk provider URI. The request may preferably contain an Authorization header field utilizing the access token 414 and a RIPT provisioning object in the body. The RIPT provisioning object contains a RIPT consumer URI and a RIPT bearer token, as illustrated in FIG. 4. The RIPT trunk consumer URI 420 minted by the RIPT consumer may, for example, be an HTTPS URI with a path component and a globally unique path segment, and preferably should not contain any URI parameters. The bearer token 418 minted by the trunking consumer is used by the RIPT provider when performing operations against the RIPT trunk client URI. The bearer token may be constructed in a way desired by the RIPT consumer, and should remain valid for at least one day, however, may be invalidated in the event of a security problem. Preferably, the RIPT consumer should refresh the provisioning against the RIPT trunk at least on hour in advance of the expiration in order to ensure no calls are delayed.

In the example shown in FIG. 4, the trunking consumer and the trunking customer 102 are the same for simplicity of illustration. It should be understood, however, that the usage of the authentication (e.g., OAuth2.0) flow enables the trunking consumer and trunking customer 102 to be the same (e.g., a cloud PBX provider purchases services from a telco), or different (e.g., an enterprise customer has purchased trunking services from a telco, and wishes to provision them into a cloud contact center that acts as the trunking consumer). The latter is often referred to informally as "BYOSIP" in traditional SIP trunking and may, for example, be supported by RIPT using OAuth2.0.

Once provisioned, both sides obtain capability declarations 424, 426 for the RIPT trunk. For example, each client may perform a GET to /capAdv of its peer's trunk URI, and the response body may include a RIPT capabilities object. The capabilities declaration 424, 426 may be a simple document that conveys the receive capabilities of the entity sending it, and includes parameters, such as maximum bitrate for audio. This process is optional, and each parameter may have a default. In embodiments, either side may be able to update its capabilities for the RIPT trunk at any time, and trigger a fresh GET via an HTTP push. Capability declarations 424, 426 occur outside of a call and convey static receive capabilities which are a fixed property of the RIPT trunk. Consequently, capability declaration is significantly different from SDP offer/answer.

Once established, either side may update the capabilities declarations 424, 426, for example by sending an HTTP push to trigger its peer to fetch a fresh capabilities document.

Due to race conditions, it is possible that the client may receive calls compliant to the old capabilities document for a brief interval.

When the trunk resource is destroyed, its associated capabilities are also destroyed.

The RIPT capabilities document may, for example, be is a list of name-value pairs, which specify a capability. Every capability may have a default, so that if no document is posted, or it is posted but a specific capability is not included, the capability for the peer is understood. Capabilities may be receive only, and specify what the entity is willing to receive. Capabilities may be bound to the RIPT trunk and be destroyed when the RIPT trunk is destroyed.

In addition, codecs can be listed as capabilities. This may be done by using the media type and subtype, separated by a "/", as the capability name. Media type and subtype values may be taken from the IANA registry for RTP payload format media types. The value of the capability is "true" if the codec is supported, "false" if it is not. The default is "false" for all codecs except for "audio/PCMU", "audio/opus", "audio/telephone-event" and "audio/CN", for which the default is "true". Because codec capabilities are receive-only, it is possible, and totally acceptable, for there to be different audio codecs used in each direction.

In general, an entity may preferably declare a capability for any characteristic of a call which may result in the call being rejected. This facilitates prevention of call failures, along with clear indications of why calls have failed when they do. For example, if a RIPT trunk provider provisions a trunk without support for G.729, but the consumer configures to utilize this codec, this will be known as a misconfiguration immediately. This enables validation of trunk configurations in an automated fashion, without placing test calls or calling customer support.

Initiating Calls and Establishing the Signaling Byways

Figure 5:
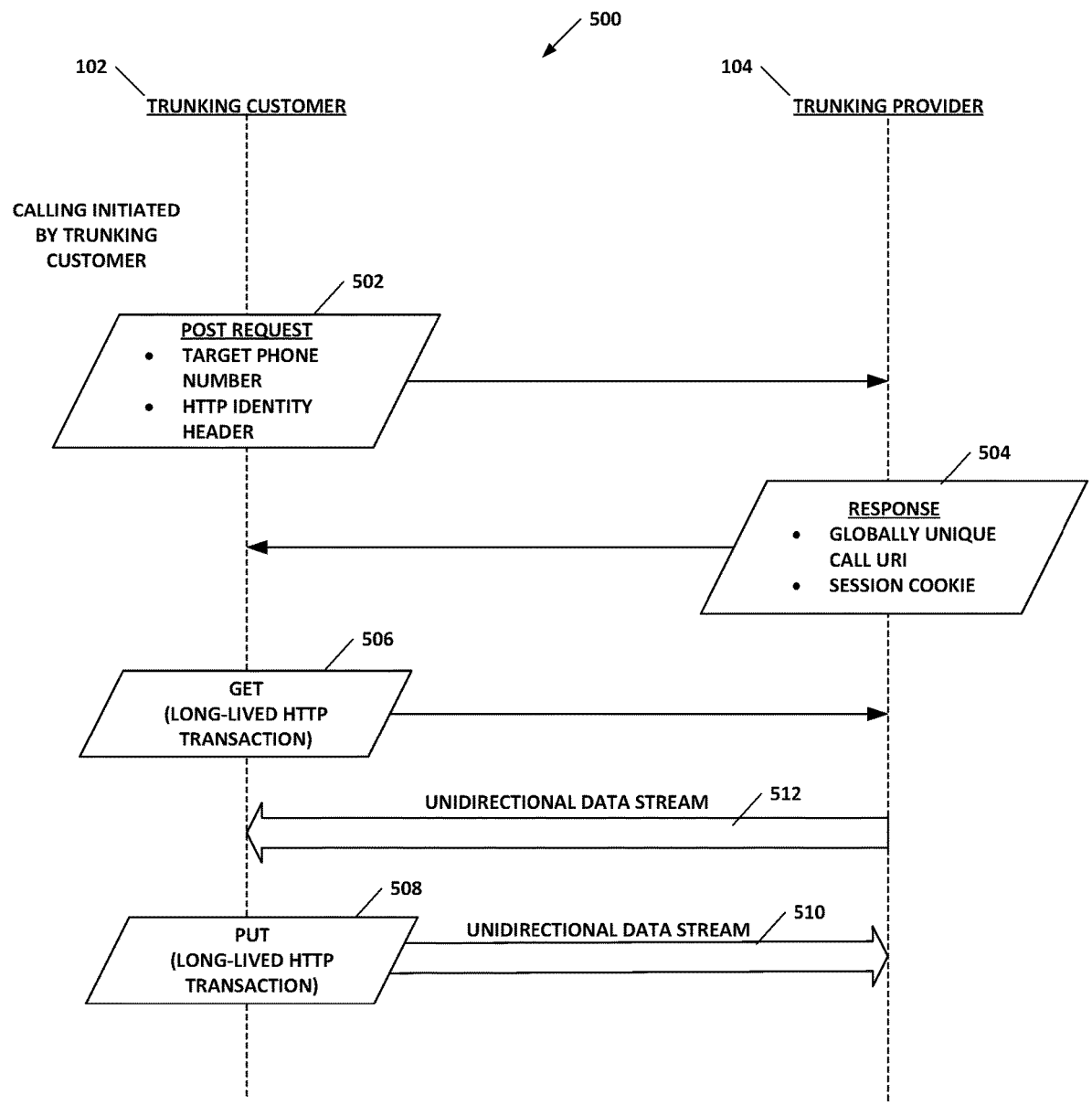
FIG. 5 is a flow diagram illustrating an example of a call initiated by a trunking customer telephony utilizing HTTP.
Figure 6:
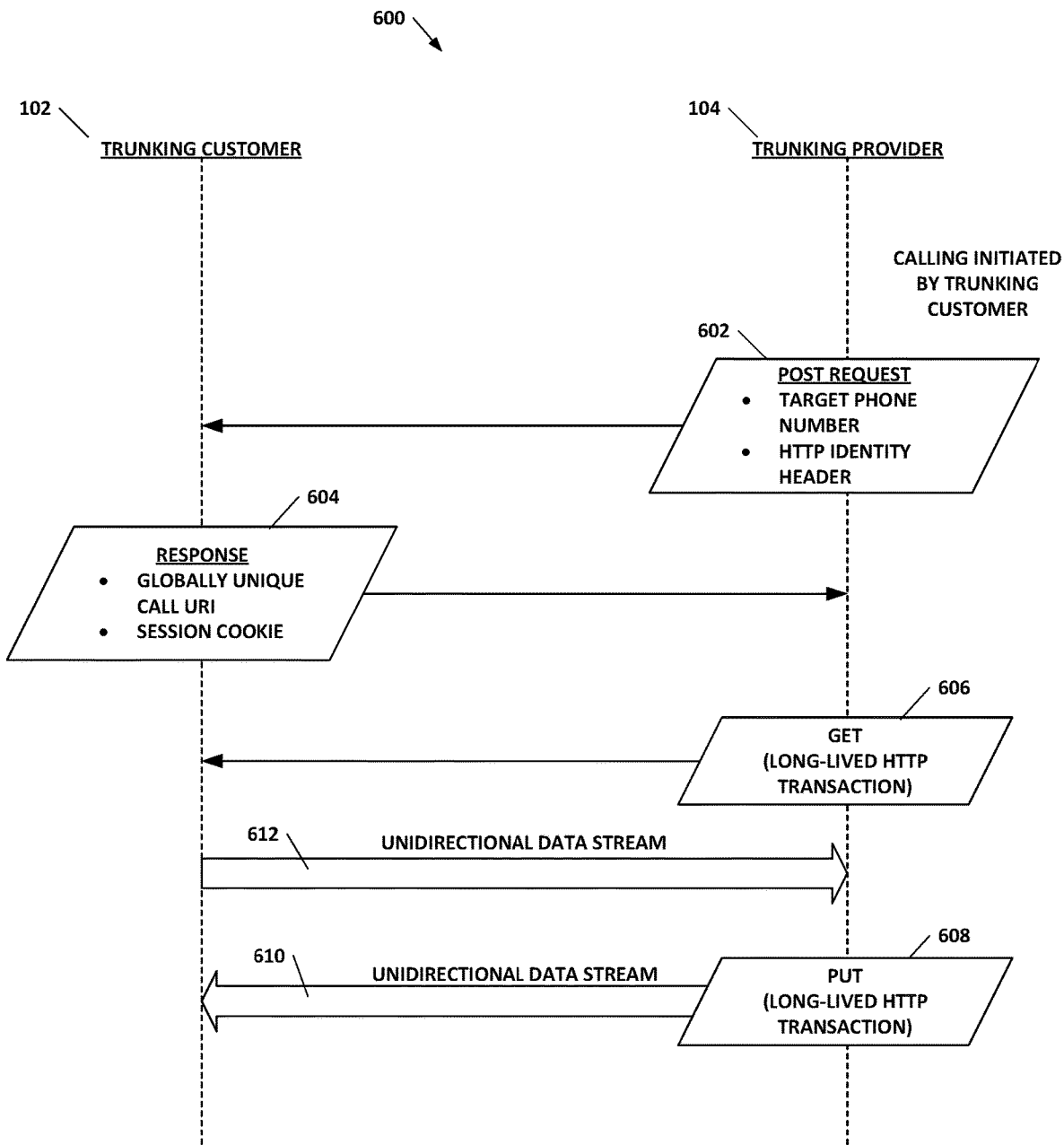
FIG. 6 is a flow diagram illustrating an example of a call initiated by a trunking provider utilizing HTTP.

After provisioning is complete, calls may be initiated by either the trunking customer 102 or trunking provider 104, as illustrated in FIGS. 5 and 6. In particular, FIG. 5 illustrates an example 500 of a call initiated by the trunking customer 102, and FIG. 6 illustrates an example 600 of a call initiated by the trunking provider 104.

Either the trunking consumer 102 or trunking provider 104 can initiate calls, for example by posting 502, 602 to the /calls on RIPT trunk URI of its peer. For a trunking consumer, this is the RIPT trunk RUI provisioned during the authentication (e.g., OAuth2.0) flow. For the trunking provider, it is the RIPT trunk consumer URI learned through the provisioning POST operation. In embodiments, the request may be an HTTP/3 transaction, and the client may validate that the TLS certificate that this returned matched the authority component of the RIPT trunk URI. The request 502, 602 may contain the target phone number in the request URI and an Identity header field in the HTTP Request, as shown in FIGS. 5 and 6. The Identity header field may, for example, be identical in syntax and semantics to a SIP Identity header field, just carried in HTTP instead of SIP. Preferably, the Identity header field is a valid HTTP header field to ensure that all calls utilize secure caller ID. A RIPT client should preferably not place the caller ID any place except for the Identity header field in the request 502, 602, and a "From," "Contact," or "P-Asserted-ID" should preferably not be included in the Identify header field.

In embodiments, the request 502, 602 may contain the token that the client has obtained out-of-band. For the RIPT consumer 102 this may be the authorization (e.g., OAuth) token, and for the RIPT trunk provider 104 this may be the bearer token learned through the provisioning POST operation. The client may also add the "target" URI parameter, which may for example be of the form user@domain. If the target is a phone number on the PSTN, the URI parameter may take the form <e164>@e164.arpa, where <e164> is a valid E.163 number. RIPT may also support private trunks, in which case the URI parameter may take the form <number>@<domain>, where the number is a non-E164 number scoped to be valid within the domain. In embodiments, RIPT may also be used to place a call to application services, such as a recorder, in which case the URI parameter may take the form of an RFC822 email address.

Upon receipt of the request 502, 602, the receiving server should preferably validate the authentication (e.g., OAuth) token and act as the verifying party to verify the Identity header field, and then either accept or reject the request 504, 604 to authorize or decline the creation of a new call. If the call is accepted, indicating that the server is willing to accept the call, the server generates a response 504, 604. The generated response 504, 604 includes a location header field, for example containing an HTTPS URI that identifies the call that has been created. The URI identifying the call may, for example, include a path segment that contains a type 4 UUID, ensuring that call identifiers are globally unique.

The response 504, 604 may also include a session cookie, bound to the call, to facilitate sticky session routing in HTTP proxies. This allows all further signaling and media to reach the same RIPT server that handled the initial request, while facilitating failover should that server go down. The client should preferably support receipt of cookies, and should be prepared to receive up to 10 cookies per call. In embodiments, the client may destroy all cookies associated with a call when the call has ended. Cookies may also be restricted in size.

The usage of an HTTP URI to identify the call itself, combined with session cookies, gives the terminating RIPT domain a great deal of flexibility in how it manages state for the call. In traditional softswitch designs, call and media state is held in-memory in the server and not placed into databases. In such a design, a RIPT server can use the session cookie in combination with sticky session routing in the load balancers to ensure that subsequent requests for the same call go to the same call server. Alternatively, if the server is not using any kind of HTTP load balancer at all, it can use a specific hostname in the URI to route all requests for this call to a specific instance of the server. This technique is particularly useful for telcos who have not deployed HTTP infrastructure, but do have SBCs that sit behind a single virtual IP address. The root URI can use a domain whose A record maps to this IP. Once a call has landed on a particular SBC, the call URI can indicate the specific IP of the SBC. For example, the RIPT trunk URI for such a telco operator might be:

<https://sbc-farm.telco.com/trunks/6ha937fjjj9> which always resolves to 1.2.3.4, the VIP shared amongst the SBC farm. Consequently, a request to this RIPT trunk would hit a specific SBC behind the VIP. This SBC would then create the call and return a call URL which points to its actual IP, using DNS:

<https://sbc23sbc-farm.telco.com/call/ ha8d7f6fso29s88clzopa>

In embodiments, the HTTP URI for the call should not contain an IP address; it should instead utilize a valid host or domain name. This is to ensure that TLS certificate validation functions properly without manual configuration of certificates (a practice which is required still for SIP based peering). Neither the request, nor the response, contain bodies.

Once a call has been created, a pair of long-lived HTTP transactions is initiated from the client to the server for purposes of signaling. One is a GET transaction 506, 606, retrieving call events from its peer. The other is a PUT transaction 508, 608, sending call events to its peer. Each of these transactions produces a unidirectional data stream, one data stream 510, 610 in the forward direction, and another data stream 512, 612 in the reverse direction 612. These data streams are called byways. HTTP/3 ensures zero RTT for setup of these byways. In embodiments, the long-lived HTTP transactions may utilized a stream of JavaScript Object Notation (JSON) in the PUT request and a stream of JSON in the GET response. In this case, the body may begin with an open curly bracket, and after that a series of JSON object, each starting with a curly bracket and ending with a curly bracket, and each side should immediately send their respective open brackets after the HTTP header fields. Streaming JSON may, for example, be utilized in order to facilitate usage of tools like cURL for signaling operations.

Signaling commands may be encoded into the signaling byway using streaming JSON in both directions. Each JSON object encodes an event and its parameters. Events may, for example, be defined for alerting, connected, ended, migrate, keepalive, and transfer-and-takeback.

The media byways may carry a simple binary encoding in both directions. Even though data can flow in both directions, a media byway is unidirectional in terms of media transmission. A forward media byway carries media from the client to the server, and a reverse byway carries media from the server to the client. To eliminate Head-of-Line (HOL) blocking for media, a media packet is sent on a media byway when it is first established. After the first packet, the client cannot be sure a subsequent packet will be delayed due to the ordering guarantees provided by HTTP/3 within a stream. To combat this, both sides may acknowledge the receipt of each packet using an ACK message sent over the media byways, in the opposite direction of the media. Consequently, in a forward media byway, ACK messages are carried from server to client, and in a reverse media byway, they are carried from client to server. Once a media packet is acknowledged, the media byway can be used once again without fear of HOL blocking. Because each media packet is acknowledged independently, each side can compute statistics on packet losses and delays. Consequently, the equivalent of Real-Time Transport Control Protocol (RTCP) sender and receiver reports may not be needed.

In embodiments, RIPT may also provide for congestion control at the client side. Specifically, the RIPT protocol may cause clients to drop media packets if there are too many media byways in the blocked state.

RIPT provides a simple technique for allowing a call to seamlessly migrate from one client instance to another on a different host, or from one server instance to another on a different host. For a client, RIPT need only end the byways in use for the call and re-initiate from a different instance. Similarly, a server can request migration, and this triggers the client to perform this same action. The call state persists independently of the state of the HTTP connection or the byways embedded in HTTP transactions, so that a reconnect can continue where things left off.

In embodiments, RIPT trunks can be destroyed by a trunking consumer, for example by issuing a DELETE against the RIPT trunk provider URI.

The Media Sequence

In RIPT, media is represented as a continuous sequence of RIPT media frames embedded in a media byway. Each RIPT media frame encodes a variable length sequence number offset, followed by a variable length field, followed by a codec frame equal to that length. The media byway itself, when created, includes properties that are shared across all media frames within that byway. These parameters include the sequence number base, the timestamp base, the codec type, and the frame size in milliseconds for the codec.

This is a significantly different design than RTP, which conveys many repeated parameters (such as the payload type and timestamp) in every packet. Instead, RIPT extracts information that will be shared across many packets and associates it with the byway itself. This means that the media frames only need to contain the information that varies—the sequence number and length.

Figure 7:
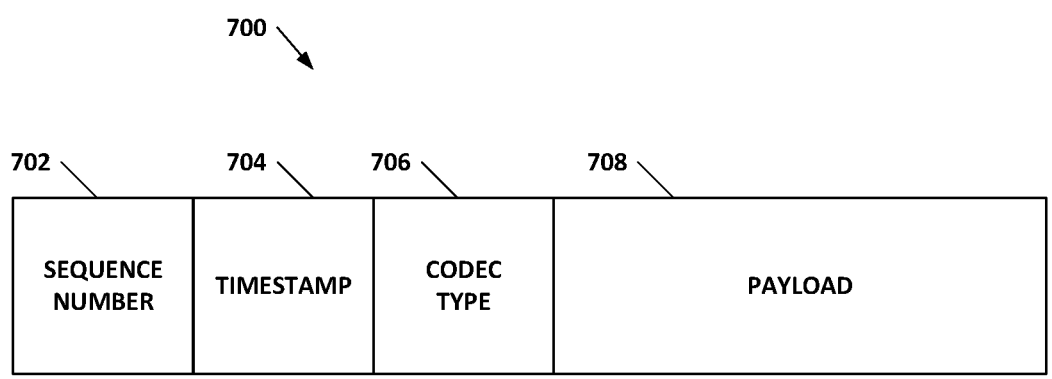
FIG. 7 is a diagram of an example media frame for use in telephony trunking between a provider and a consumer utilizing HTTP.

Consequently, in embodiments, each RIPT media frame 700 has the following properties, as shown in FIG. 7:
 a sequence number 702, which may be equal to the sequence number base associated with the media byway plus the value of the sequence number offset;
 a timestamp 704, which may be equal to the timestamp base from the byway plus the sequence number offset times the frame size in milliseconds (note that this requires that frame size remain fixed for all media frames in a byway);
 an identification of the codec type 706, which may be a fixed property of the byway; and
 the media frame payload 708.

In embodiments, RIPT will not support gaps in the media sequence due to silence. In this case, something must be transmitted for each time interval. If a RIPT implementation wishes to change codecs, it may utilize a different byway for that codec.

Opening Media Byways

The RIPT client bears the responsibility for opening media byways—both forward and reverse. Consequently, the server is strongly dependent on the client opening reverse byways; it cannot send media unless a reverse byway has opened.

In embodiments, a RIPT client may open a new forward byway whenever it has a media frame to send, all existing forward byways (if any) are in the blocked state, and the client has not yet opened 20 byways.

In embodiments, the client may be required to keep a minimum number (e.g., 10) of reverse byways open at all times to ensures that the server can send media. In certain embodiment, the client may be required to open these byways immediately, in parallel.

The use of multiple media byways in either direction helps to provide a low latency operation. This is because, as describe below, media frames may be sprayed across multiple byways to prevent head-of-line blocking. This may be possible, for example, because in HTTP/3 each transaction is carried over a separate QUIC stream, and QUIC streams run on top of UDP. Furthermore, a QUIC stream does not require a handshake to be established—creation of new QUIC streams is a 0-RTT process.

In embodiment, the requests to create these transactions may include cookie headers for any applicable session cookies.

In embodiments, a client may open a forward media byway, as shown in FIGS. 5 and 6, by initiating a POST request to the /media-forward endpoint on the call URI, which includes a RIPT-Media header field in the request headers. Similarly, to open a reverse media byway, the client may initiate a POST request to the /media-reverse endpoint of the call URI. The POST request for opening a reverse media byway, however, does not include a RIPT-Media header field in the request headers. Instead, the server includes the RIPT-Media header in the response headers. The RIPT-Media header contains the properties for the byway, such as the sequence number base, the timestamp base, and the name of the codec.

In embodiments, RIPT may supports multiple audio channels for active recording sessions, such as Session Recording Protocol (SIPREC) use cases. In this case, each channel is on a separate byway. When multi-channel audio is being used, the client may include the multi-channel parameter and the channel number, starting at 1.

In embodiments, the sequence number space is unique for each direction, channel, and call (as identified by the call URI). For example, each side may be required to start the sequence number at zero, and increment the sequence number by one for each subsequent media frame. In embodiments, the sequence number base is represented as a string corresponding to a 32 bit unsigned integer, and the sequence number offset in the media frame is variable length, representing an unsigned integer. Consequently, the sequence number space for a media stream within a call may have a total space of 32 bits. In this case, with a minimum frame size of 10 ms, RIPT can support call durations as long as 11,930 hours. In embodiments, rollover of the sequence number is not permitted, and the client or server must end the call before rollover. This means that the combination of call URI, direction (client to server, or server to client), channel number, and sequence number represent a unique identifier for media packets.

Sending and Receiving Media

Media is sent and received in RIPT using media striping. To avoid Head-of-Line (HOL) blocking, a second media packet should not be sent on a byway until there is certainty that the prior media packet has been received. This is why a RIPT client may open multiple media byways.

In embodiments, when either the client or server sends a media frame on a byway, it immediately marks the byway as blocked. At that point, the client or server should not send another media frame on that byway. The client or server may note the sequence number and channel number for that media frame. Then, once an acknowledgement is received for that corresponding media frame, the client or server may mark the byway as unblocked. A client or server may send a media frame on any unblocked byway.

Per the logic described above, the client may open additional byways once the number of blocked byways goes above a threshold. For example, if the number of blocked byways in either direction hits 75% of the total for that direction, this may be a signal that congestion has occurred. In such a case, the client or server may either drop packets at the application layer, or buffer them for later transmission.

When a client or server receives a media frame, it sends an acknowledge message. This acknowledge message may be sent on the same byway that the media was received. The acknowledgement message may, for example, contain the full sequence number and channel number for the media packet that was received. In embodiments, the acknowledgment message may also contain the timestamp, represented as wallclock time, at which the media packet was received.

In embodiments, if the server has marked 75% of the reverse media byways as blocked, it may send a signaling event instructing the client to open another reverse media byway. Once this command is received, the client may open a new reverse byway, unless the total number of byways has reached a maximum number (e.g., 20).

In embodiments, a client may terminate media byways gracefully if they have not sent or received packets on that byway for a set amount of time (e.g., 5 or more seconds). This is to clean up unused byways.

In embodiments, there is no need for sender or receiver reports because the equivalent information is knowable from the application layer acknowledgements.

Terminating and Re-Establishing Connections and Byways

In embodiments, the state of the connection, the media (e.g., QUIC) streams, and byways, is separate from the state of the call. The client may therefore terminate an HTTP connection or byway at any time, and re-establish it. Similarly, the server or client may end a byway at any time.

If a byway ends or the connection breaks or is migrated, the client should re-initiate the byways immediately, or risk loss of media and signaling events. However, to deal with the fact that re-establishment takes time, both client and server may buffer their signaling and media streams for a set period (e.g., at least 5 seconds), and then once the connections and byways are re-established, send all buffered data immediately.

In embodiments, it may be the sole responsibility of the client to make sure byways are re-established if they fail unexpectedly.

Signaling—Events

Signaling may be performed by having the client and server exchange events. For example, each event may be a JSON object embedded in the signaling stream, which conveys the event as perceived by the client or server. Each event may have a sequence number, for example which starts at zero for a call, and increases by one for each event. The sequence number space may be unique in each direction. The event may also contain a direction field, which indicates whether the event was sent from client to server, or server to client. The event may also contain a timestamp field, which indicates the time of the event as perceived by the sender. In embodiments, the timestamp is not updated when retransmissions happen because the timestamp exists at the RIPT application layer and RIPT cannot directly observe HTTP retransmits.

The event may also contains a call field, which contains the URI of the call in question. The event may also include an event type field, which conveys the type of event. In embodiments, the event type field is followed by additional fields that are specific to the event type.

This structure means that each event carried in the signaling is totally self-describing, regardless of the enclosing connection and stream. This greatly facilitates logging, debugging, retransmissions, retries, and other race conditions which may deliver the same event multiple times, or deliver an event to a server which is not aware of the call.

Events may also be defined so that the resulting state is uniquely defined by the event itself. This ensures that knowing the most recent event is sufficient to determine the state of the call.

Following are example events that may be supported by a RIPT system:

alerting: passed from server to client, indicating that the recipient is alerting.

accepted: passed from server to client, indicating that the call was accepted.

rejected: passed from server to client, indicating that the call was rejected by the user.

failed: passed from server to client, indicating that the call was rejected by the server or downstream servers, not by the user, but due to some kind of error condition. This event may contain a response code and reason phrase.

noanswer: passed from server to client, indicating that the call was delivered to the receiving user but was not answered, and the server or a downstream server timed out the call.

end: initiated by either client or server, indicating that the call is to be terminated. This does not delete the HTTP resource, it merely changes its state to call end. In embodiments, a call cannot be ended with a DELETE against the call URI; DELETE is not permitted and is rejected by the server. The call end event may contain a reason, for example using predefined Reason codes.

migrate: sent from server to client, instructing the client to terminate the connections and re-establish the connections to a new URI which replaces the URI for the call. The event contains the new URI to use, which may utilize the same path components, and may have a different authority component.

open-reverse: sent from server to client, instructing the client to open an additional set of reverse media byways.

tnt: send from consumer to provider, invoking a takeback-and-transfer operation. This event may include the phone number to which the call should be transferred. The provide will then transfer the call to the target number. This event is meant to invoke the feature as it has been implemented by the provider.

Call Termination

Signaling may allow an application layer call end to be sent. This may also cause each side to terminate the outstanding transactions, for example using end flags per HTTP/3 specs. However, the opposite is not true—ending of the transactions or connection does not impact the call state.

In embodiment, the server maintains a timer with a predetermined time limit (e.g., one second) for which it will hold the call in its current state without any active signaling byway. If the server does not receive a signaling byway before the expiration of this timer, it may consider the call as ended.

In embodiments, if a server receives a signaling or media byway for a call that is in a terminated state, the server rejects the transaction with an XX response code.

Once the call has ended, the call resource may be destroyed.

GET Transactions

In embodiments, a client may initiate a GET request against the call URI at any time. This returns the current state of the resource. For example, the GET request may return the most recent event, either sent by the server or received by the server.

Graceful Call Migration: Server

To facilitate operational maintenance, RIPT may provide built in support for allowing a server instance to drain all active calls to another server instance. In this case, the server can issue a migrate event over the signaling byway, which includes a new call URI that the peer should use. Once received, the client closes all transactions to the current call URI. The client then establishes new signaling, media and media control byways to the URI it just received. All media that the client wishes to transmit, but was unable to do so during the migration, may be buffered and then sent in a burst once the media byways are re-established. This ensures there is no packet loss (though there will be jitter) during the migration period.

Graceful Call Migration: Client

In embodiment, RIPT clients are able to easily move a call from one client instance to another. No commands are required. The client simply ends the in-progress transactions for signaling and media, and then reinitiates them to the existing call URI from whatever server is to take over. In embodiments, the client may be required to do this within a set time limit (e.g., 1 s) or the server will end the call.

Ungraceful Call Migration

Since all media packets are acknowledged at the application layer, it is possible for endpoints to quickly detect remote failures, network failures, and other related problems. In embodiments, the RIPT client is responsible for failure detection. The following are examples of failure situations that may trigger a failure detection by a RIPT client:

1. the QUIC connection closes unexpectedly;
2. any outstanding signaling or media byway is reset by the peer;
3. no media packets are received from the peer for 1 s; or
4. no acknowledgements are received for packets that have been sent in the last 1 s.

In embodiments, if the client detects such a failure, it aborts all ongoing transactions to the server, terminates the QUIC connection, and then establishes a new connection using 0-RTT, and re-establishes signaling and media transactions. If this retry fails, the client may consider the call terminated, and should not further attempt to re-establish the call.

SIP Gateway

In embodiments, it is easy to gateway to RIPT from SIP. RIPT may, for example, be implemented in Session Border Controllers (SBCs) and softswitches. A SIP to RIPT gateway should be call-stateful, acting as a back-to-back user agent (B2BUA), in order to gateway to RIPT. Furthermore, a SIP to RIPT gateway should act as a media termination point in SIP, should perform any SRTP decryption and encryption, and it should de-packetize RTP packets to extract their timestamps, sequence numbers, and codec types.

SIP to RIPT gateways may not be transparent. SIP header fields which are unknown or do not map to RIPT functionality may be discarded.

Any configuration and provisioning for RIPT happens ahead of receipt or transmission of SIP calls. Consequently, the logic described here applies at the point that a gateway receives a SIP INVITE on the SIP side, or receives a POST to the RIPT trunk URI on the RIPT side.

Using the Call URI for SBC Gateways

In embodiments, systems employing the RIPT protocol enable telcos, having existing SBC deployments, to allow those SBCs to originate and receive calls over RIPT without requiring any change in deployment architecture. Several approaches are common in a typical SBC deployment today:

Case 1: SBCs are deployed in an active/passive configuration. They share a VIP (virtual IP) for both signaling and media. When the active fails, the VIP is switched to the passive SBC.

Case 2: There is a cluster of SBCs, deployed behind a SIP proxy pair. The SIP proxy pair share a VIP, acting in an active/passive configuration. The SIP proxy load balances the calls across the SBC farm. Media flows directly to the SBC, and signaling through the (stateful) proxy.

Case 3: As Case #2, except the proxy doesn't record-route. As a result, the initial INVITE goes to the proxies, but once the call is routed to an SBC, all subsequent signaling is routed directly to the SBC (along with media).

Case 4: As Case #2 or #3, except the proxies don't share a VIP. Rather, they each have a separate IP address. DNS is used to round robin across the proxy farm. This means there can be more than 2 SIP proxies, and they are all active.

To support some of these deployment topologies, embodiments of RIPT may provide one or more enhanced features, as follows. When a call is created via a POST operation to the trunk URI, two unique URI are returned. One URI represents the call endpoint for the signaling channel, and the other URI represents the endpoint for media. The RIPT client may then establish a byway to the signaling URI for signaling, and establish a byway to the media URI for the media byways.

In embodiments of RIPT, these basic topologies can be preserved for receiving incoming calls. Let us consider examples for each of the above four cases:

Case 1: The SBC implements RIPT also, for example running an HTTPS server on port 443. The RIPT provider trunk URI is a hostname which is configured in the DNS to resolve to this VIP (e.g., sbc-vip.provider.com). This means that the incoming HTTP requests will arrive at the active SBC. This SBC will create a call URI, and the call URI also uses the same hostname—sbc-vip.provider.com. This means that all mid-call signaling will continue to arrive to this VIP and be routed to the active SBC. The provider does not need to add any kind of HTTP load balancer—it just needs the SBC vendor to add support for RIPT.

Case 2: The SBC adds RIPT support. Beyond that, there are two example solutions. First, an HTTP proxy is added. This can be done, for example, by adding HTTP proxy support to the SIP proxy or adding an off the shelf http proxy. Alternatively, the provider can deploy a separate web server, not a proxy. Let us consider the proxy case separately from the web server case:

Case 2—First Example Solution: In the proxy case, the RIPT trunk provider URI may be proxy-vip.provider.com, pointing to the VIP which is associated with the HTTP proxy, whether this is implemented as a feature of the sip proxy or a standalone http proxy. HTTP/rip requests arrive there. These are proxied to the SBCs, which implement RIPT. The SBCs generate a call URI with a domain of proxy-vip.provider.com and include in the path segment, an indicator of which SBC is handling the call. For example, https://proxy-vip.provider.com/calls/call24/sbc12 would indicate that call 24 is present on SBC 12. The media URI would have a host part that routes directly to SBC12: e.g., https://sbc-12.provider.com/calls/call24. When done this way, the RIPT client may open a signaling byway which goes to the proxies, which can then route to the SBC. The media byways may be opened directly to the SBCs.

Case 2—Second Example Solution: In the web server case, a separate, standalone web server may be implemented and deployed. The RIPT trunk provider URI may be https://webserver.provider.com. There may or may not be a VIP; this webserver is likely part of the normal web infrastructure for the provider, and not part of its telecom infrastructure. This web application will monitor the up/down status of the SBCs through an out of bands means. When a POST arrives to the RIPT trunk provider URI, the web server selects an SBC that is active, and then encodes its hostname into the domain part of both the signaling and media URIs—e.g., https://sbc-12.provider.com. This causes the signaling and media byways to be opened directly to the SBC. This approach may, for example, be beneficial for telcos who have a highly separated web and sip/telecom infrastructure. It enables them to use their existing web infra for the creation of calls, implementing the load balancing amongst the SBCs, and then direct the actual calls to the telecom infra of the SBCs. Note that, in this case, subsequent signaling does not pass through the web server, rather it goes to the SBC.

Case 3: This topology is easy to implement in RIPT. As with Case 2, there is either a web server, or a proxy. If it is a web server, as in the Second Example Solution for Case 2 (above), the flow is identical. In the case of a proxy, it is similar to the First Example Solution for Case 2 (above), except that the call URI minted by the SBC points to itself—e.g., https://sbc-12.provider.com/calls/call24 would be used for BOTH the signaling and media call URI.

Case 4: This topology is also easily implemented in RIPT. The proxies, which are now HTTP proxies, all have DNS entries and queries are load balanced across them. The RIPT trunk URI points to the domain name which has these entries—e.g., proxy-farm.provider.com. This will cause the POST request to create a call to arrive to one of these proxies. The proxy can route the request to a specific SBC, and this SBC can place its own hostname into the call and media URI fields.

In addition to the above examples, RIPT also allows for another topology for telcos. In this example topology, the RIPT trunk provider URI points to either a VIP, or a farm of entry proxies (e.g., proxy-farm.provider.com). When a POST request arrives, it comes to one of these entry proxies. The request is proxied to an SBC, and the SBC creates a call. However, the hostname in both the call and media URI is proxy-farm.provider.com. The SBC encodes its identity, and the callID, into the URL as well. For example the call and media URL may both be https://proxy-farm.provider.com/calls/call12/sbc-23. This indicates that call12 is actually on SBC 23. When the client creates the signaling and media byways, these are just HTTP requests, which route once again to the proxy farm. However, the proxy farm can see that these requests are for an established call, and the identity of the SBC is embedded in the URI-SBC 23. The proxies route these requests there. Should SBC 23 fail, the proxies may select an alternative.

The above approach relies on configuration of the HTTP proxy to know about the hostnames of downstream servers and load balance amongst them. This is not how typical HTTP proxy routing is done. As such, RIPT enables yet another solution which is more consistent with HTTP load balancing, using session cookies. In this example solution, the provider hosts a farm or entry proxies, either using VIP techniques or DNS to load balance amongst them. Thus the domain name used for the proxies might be proxy-farm.provider.com. When an incoming POST arrives to create a call, the resulting 200 OK is proxied back through the proxy farm. This includes a Cookie-Set header field, which sets a cookie for this specific call. This cookie can either be inserted by the RIPT server behind the proxy, or by the proxy itself. The call and media URIs are also directed to the proxy-farm.provider.com. When the HTTP requests arrive to create the signaling and media byways, these arrive at the proxy farm. The HTTP load balancer inspects the cookies and will continue to route the transactions to the same backend server which created the cookie. This is common HTTP server behavior.

Figure 8:
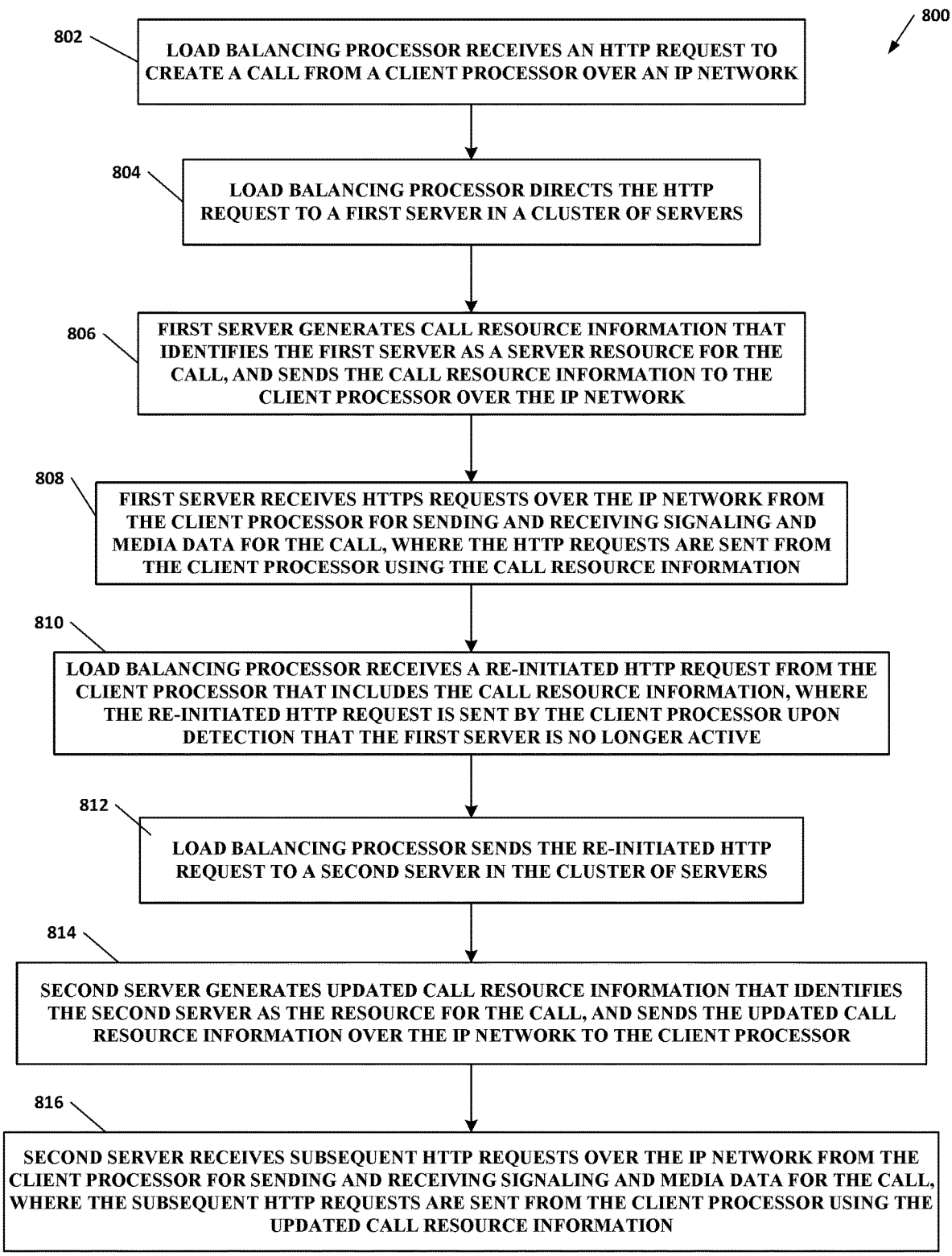
FIG. 8 is a flow diagram of an example method for providing a VoIP call.

FIG. 8 is a flow diagram showing an example method for providing a Voice over Internet Protocol (VoIP) call. At 802, a load balancing processor receives a Hypertext Transfer Protocol (HTTP) request to create a call from a client processor over an Internet Protocol (IP) network. At 804, the load balancing processor directs the HTTP request to a first server in a cluster of servers. At 806, the first server generates call resource information identifying the first server as a server resource for the call, and sends the call resource information to the client processor over the IP network. In embodiments, the call resource information may include an HTTP Uniform Resource Identifier (URI) for the first server and/or a session cookie identifying the first server. At 808, the first server receives HTTP requests over the IP network from the client processor for sending and receiving signaling and media data for the call, where the HTTP requests are sent from the client processor using the call resource information.

At 810, the load balancing processor receives a re-initiated HTTP request from the client processor that includes the call resource information, where the re-initiated HTTP request is sent by the client processor upon detection that the first server is no longer active. In embodiments, the client processor detects that the first sever is no longer active and, in response, generates the re-initiated HTTP request. At 812, the load balancing processor sends the re-initiated HTTP request to a second server in the cluster of servers. In embodiments, the load balancing processor detects that the first server is no longer active and, in response, causes subsequent HTTP requests for the call to be redirected to the second server. At 814, the second server generates updated call resource information that identifies the second server as the server resource for the call, and sends the updated call resource information over the IP network to the client processor. In embodiments, the updated call resource information may include an HTTP URI for the second server and/or an updated session cookie identifying the second server. At 816, the second server receives subsequent HTTP requests over the IP network from the client processor for sending and receiving signaling and media data for the call, where the subsequent HTTP requests are sent from the client processor using the updated call resource information.

In embodiments, the method 800 of FIG. 8 may include the additional steps of: establishing the call between the first server and a downstream server and receiving, at the first server, downstream call resource information for the downstream server; storing the downstream call resource information in a database accessible by the cluster of servers; retrieving, at the second processor, the downstream call resource information from the database; and re-establishing the call between the second sever and the downstream server using the downstream call resource information. In embodiments, the downstream call resource information may include an HTTP URI for the downstream server. In embodiments, the first and second servers may use the downstream call resource information to generate HTTP requests for sending and receiving signaling and media packets for the call to and from the downstream media server.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. For example, in one or more alternative embodiments, RIPT may be extended to video or other media in addition to audio. Thus, it is intended that the present disclosure cover the modifications and variations of this disclosure provided they come within the scope of the appended claims and their equivalents.

What is claimed:

1. A method for providing a Voice over Internet Protocol (VoIP) call, comprising:
    receiving, at a load balancing processor, a Hypertext Transfer Protocol (HTTP) request to create a call, the HTTP request being received by the load balancing processor from a client processor over an Internet Protocol (IP) network;
    directing, by the load balancing processor, the HTTP request to a first server in a cluster of servers;

generating, by the first server, call resource information and sending the call resource information to the client processor over the IP network, the call resource information identifying the first server as a server resource for the call;

receiving, at the first server, HTTP requests over the IP network from the client processor for sending and receiving signaling and media data for the call, the HTTP requests being sent from the client processor using the call resource information;

receiving, at the load balancing processor, a re-initiated HTTP request from the client processor that includes the call resource information, the re-initiated HTTP request being sent by the client processor upon detection that the first server is no longer active;

sending, by the load balancing processor, the re-initiated HTTP request to a second server in the cluster of servers;

generating, by the second server, updated call resource information that identifies the second server as the server resource for the call, and sending the updated call resource information over the IP network to the client processor; and receiving, at the second server, subsequent HTTP requests over the IP network from the client processor for sending and receiving subsequent signaling and media data for the call, the subsequent HTTP requests being sent from the client processor using the updated call resource information.

2. The method of claim 1, wherein the call resource information includes an HTTP Uniform Resource Identifier (URI) for the first server, and the updated call resource information includes an HTTP URI for the second server.

3. The method of claim 1, wherein the call resource information includes a session cookie identifying the first server, and the updated call resource information includes an updated session cookie identifying the second server.

4. The method of claim 1, further comprising:
establishing the call between the first server and a downstream server and receiving, at the first server, downstream call resource information for the downstream server;
storing the downstream call resource information in a database accessible by the cluster of servers;
retrieving, at the second processor, the stored downstream call resource information from the database; and
re-establishing the call between the second server and the downstream server using the downstream call resource information.

5. The method of claim 4, wherein the stored downstream call resource information includes an HTTP Uniform Resource Identifier (URI) for the downstream server.

6. The method of claim 4, wherein the second server uses the downstream call resource information to generate the subsequent HTTP requests for sending and receiving signaling and media packets for the call to and from the downstream media server.

7. The method of claim 1, wherein the load balancing processor detects that the first server is no longer active and, in response, causes the subsequent HTTP requests for the call to be redirected to the second server.

8. The method of claim 1, wherein the client processor detects that the first server is no longer active and, in response, generates the re-initiated HTTP request.

9. A system for providing a Voice over Internet Protocol (VoIP) call, comprising:

a cluster of servers configured to send and receive Hypertext Transfer Protocol (HTTP) communications over an Internet Protocol (IP) network; and a load balancing processor coupled to the cluster of servers and configured to communicate over the IP network;

the load balancing processor being configured to (i) receive an HTTP request to create a call, the HTTP request being received from a client processor over the IP network, and (ii) direct the HTTP request to a first server in the cluster of servers;

the first server being configured to (i) generate call resource information that identifies the first server as a server resource for the call, (ii) send the call resource information to the client processor over the IP network, and (iii) receive HTTP requests over the IP network from the client processor for sending and receiving signaling and media data for the call, the HTTP requests being sent from the client processor using the call resource information;

the load balancing processor being further configured to (i) receive a re-initiated HTTP request from the client processor that includes the call resource information, the re-initiated HTTP request being sent by the client processor upon detection that the first server is no longer active, and (ii) send the re-initiated HTTP request to a second server in the cluster of servers;

the second server being configured to (i) generate updated call resource information that identifies the second server as the server resource for the call, (ii) send the updated call resource information over the IP network to the client processor, and (iii) receive subsequent HTTP requests over the IP network from the client processor for sending and receiving subsequent signaling and media data for the call, the subsequent HTTP requests being sent from the client processor using the updated call resource information.

10. The system of claim 9, wherein the call resource information includes an HTTP Uniform Resource Identifier (URI) for the first server, and the updated call resource information includes an HTTP URI for the second server.

11. The system of claim 9, wherein the call resource information includes a session cookie identifying the first server, and the updated call resource information includes an updated session cookie identifying the second server.

12. The system of claim 9, wherein:
the first server is further configured to (i) establish the call with a downstream server, (ii) receive downstream call resource information for the downstream server, and (iii) store the downstream call resource information in a database accessible by the cluster of servers; and
the second server is further configured to (i) retrieve the stored downstream call resource information from the database, and (ii) re-establishing the call between the second sever and the downstream server using the stored downstream call resource information.

13. The system of claim 12, wherein the stored downstream call resource information includes an HTTP Uniform Resource Identifier (URI) for the downstream server.

14. The system of claim 12, wherein the second server is configured to use the downstream call resource information to generate the subsequent HTTP requests for sending and receiving signaling and media packets for the call to and from the downstream media server.

15. The system of claim 9, wherein the load balancing processor is configured to detect that the first server is no longer active and, in response, cause the subsequent HTTP requests for the call to be redirected to the second server.

16. The system of claim 9, wherein the client processor detects that the first server is no longer active and, in response, generates the re-initiated HTTP request.

* * * * *